May 18, 1965 G. A. WOOD, JR 3,184,179
FISHING REEL WITH FRICTION DRIVE
Filed Nov. 25, 1960 3 Sheets-Sheet 1
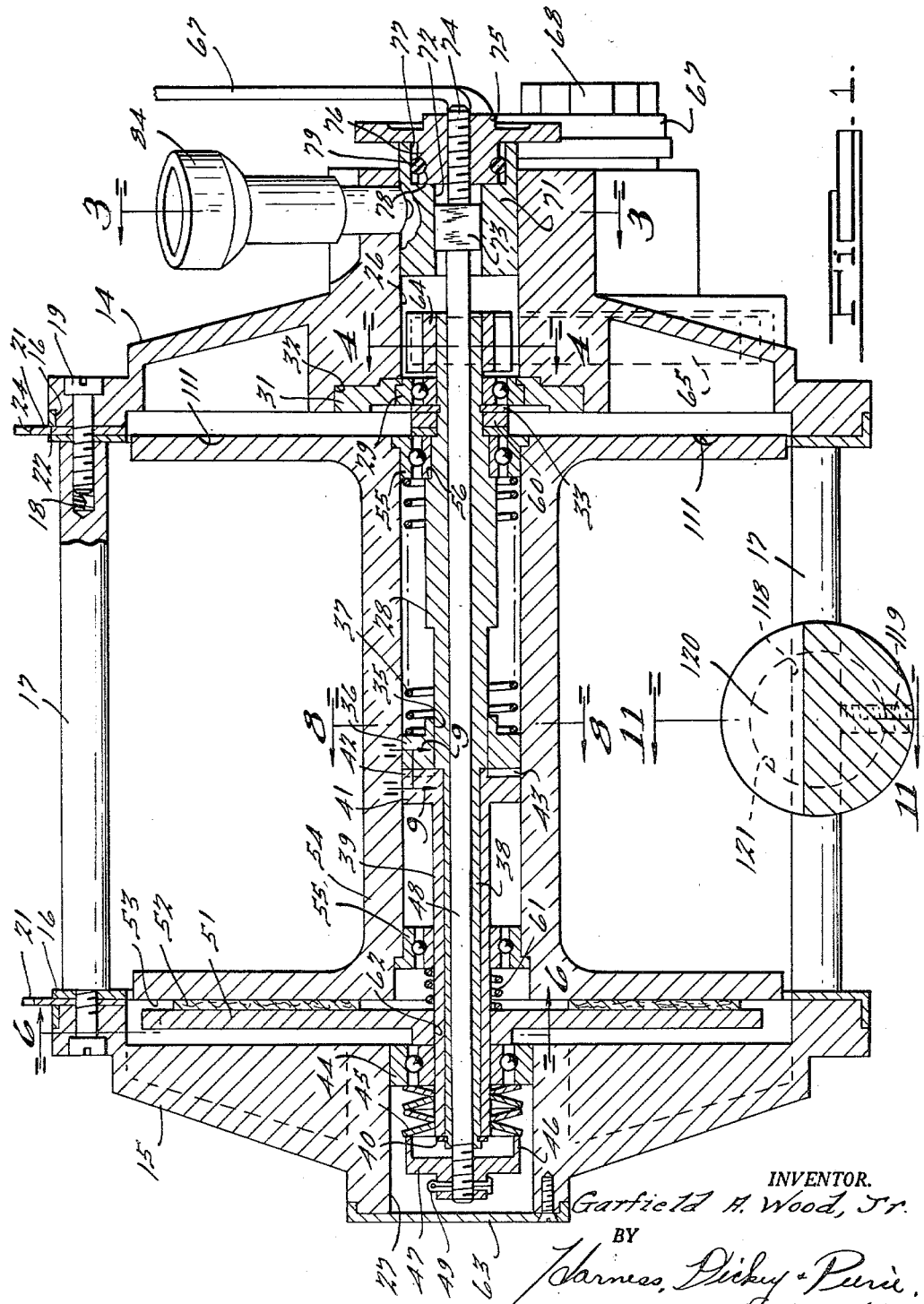
INVENTOR.
Garfield A. Wood, Jr.
BY
Harness, Dickey & Pierce.
ATTORNEYS.

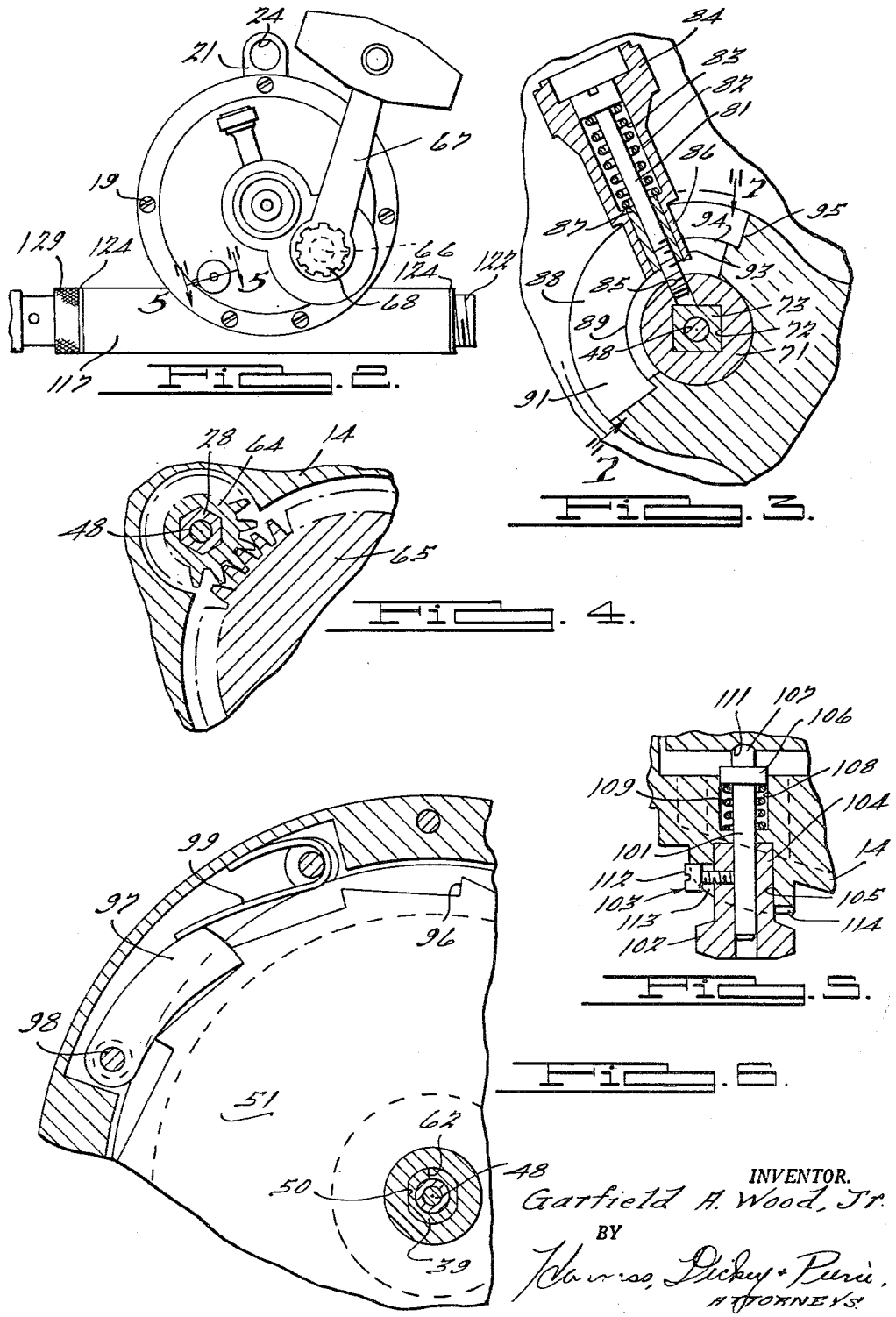

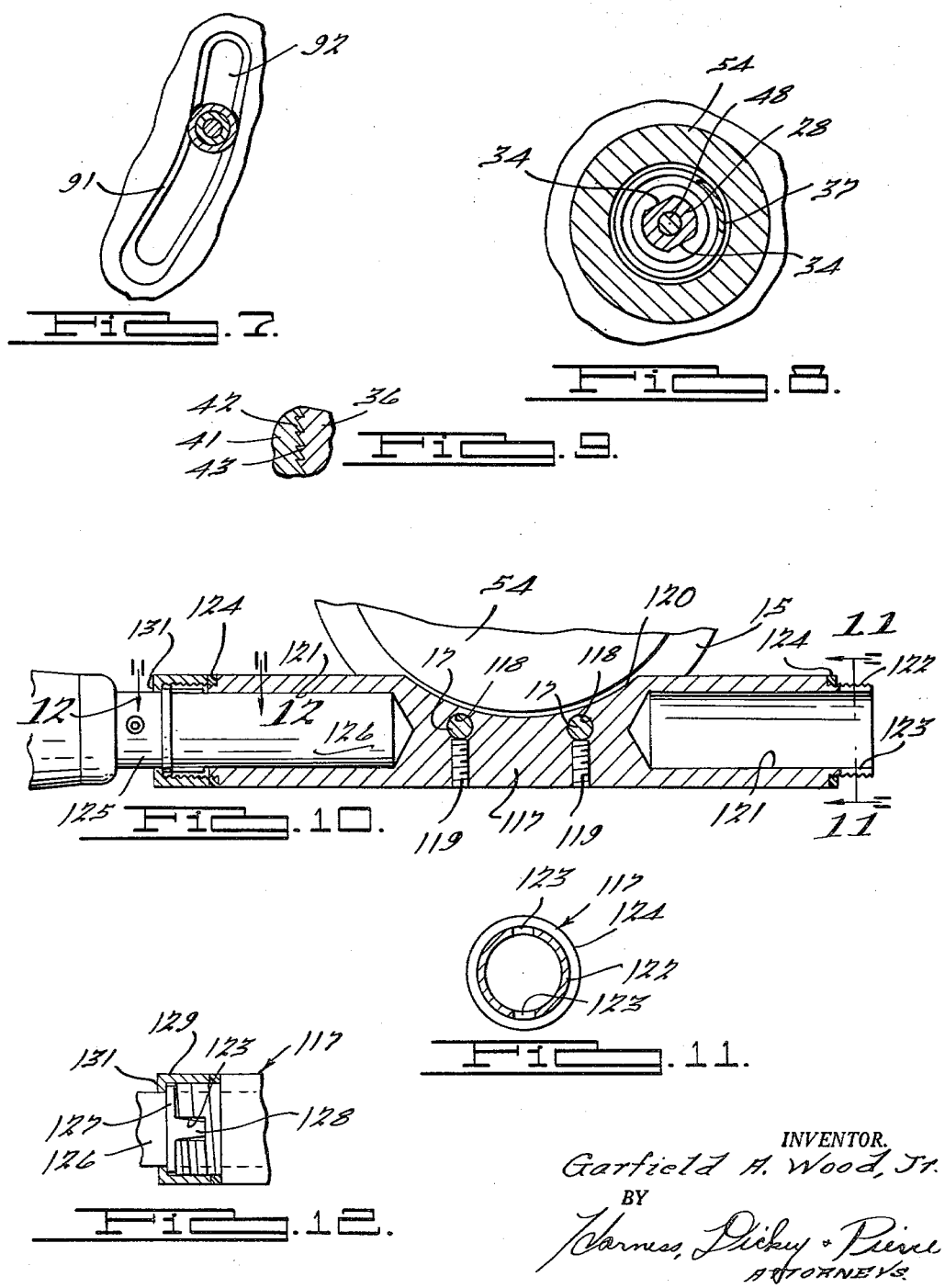

United States Patent Office 3,184,179
Patented May 18, 1965

3,184,179
FISHING REEL WITH FRICTION DRIVE
Garfield A. Wood, Jr., 4565 Sable Palm Road,
Bay Pointe, Miami, Fla.
Filed Nov. 25, 1960, Ser. No. 71,767
5 Claims. (Cl. 242—84.45)

This invention relates to fishing reels and particularly to a fishing reel having a ratchet mechanism in the drive thereof.

Difficulty has been experienced in the past with the operation of reels of the large type when playing a heavy fish due to the fact that it is practically impossible for the fisherman to crank the handle 360° because of the pull on the line. Attempts have been made to supply a second gear train in the operating mechanism which would substantially increase the mechanical advantage of the system but the change from one to the other system was usually awkward at the time of playing the heavy fish.

In practicing the present invention, a reel is provided with a ratchet mechanism in the drive system which permits the handle to be oscillated in a sector in which a greater force can be applied by the arm of the operator. With such an arrangement, when the fisherman finds it difficult to rotate the handle through 360°, it is only necessary to oscillate the handle in areas at which a force is most efficiently applied to advance the reel step by step to take in the line. By way of example, a ratchet mechanism is herein illustrated as being applied to the hollow drive shaft of the fishing reel illustrated and described in the copending application of G. A. Wood, Jr., Serial No. 844,740, filed October 6, 1959 now Patent No. 3,104,075. The shaft has a gear on one end driven by a larger gear connected to the operating handle. The opposite end of the shaft is conected to a brake mechanism which engages the spool having the line thereon. By the simple expedient of applying a pair of sleeves to the shaft, the one for rotation relative thereto and the other fixed against rotation but supported for axial movement, a ratchet mechanism is provided. The one sleeve is secured to the brake disk with the ratchet teeth held stationary so that the teeth of the axially movable sleeve may ride thereover when the handle is retracted. When the clutch disk engages the spool and its difficult to rotate the handle, the handle may be oscillated to ratchet the engaged teeth and advance the spool in the same direction as when the handle was rotated. With this arrangement, the reel may be operated in the regular manner until the load becomes so great that it is difficult for the fisherman to rotate the handle, whereupon the fisherman may oscillate the handle in an area in which he may apply the greatest force to continue to take in the line through the step by step advancement of the handle and spool.

The reel as herein illustrated is supported upon a portion of a pole so that the forward and butt portions may be attached thereto and thereby have the reel mounted on the pole.

A rod within the pair of hollow sleeves which form the ratchet mechanism is employed for applying and releasing the clutch plate to and from the end face of the spool through the longitudinal movement thereof. The rod is so arranged as to preset a desired pressure which is applied through the manipulation of a stud in a cam slot which is herein illustrated as having two different lead sections for obtaining a rapid release and a more sensitive adjustment of the pressure application between the brake and the spool.

Accordingly, the main objects of the invention are: to provide a ratchet mechanism in the drive of a fishing reel which permits the retraction of the line in steps through the oscillation of the reel handle; to apply a ratchet mechanism to the hollow drive shaft of a reel by affixing a sleeve to a brake disk and mounting a second sleeve in driving relation to the shaft and movable longitudinally thereof so as to have the adjacent teeth of the sleeves in engaged relation to permit the shaft when rotated to advance the spool in steps when the handle is oscillated through the ratcheting of the teeth; to mount a reel on a section of the pole so that the reel is supported on the pole when the butt and forward ends of the pole are secured thereto; to provide a cam slot for applying the brake disk to the spool which has a fast and a slow lead section to permit the brake to be quickly released and to have a more sensitive adjustment of the pressure to the brake disk when removed into engagement; and, in general, to provide a fishing reel with a ratchet mechanism which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a sectional view of a reel having a ratchet driving mechanism thereon embodying features of the present invention;

FIG. 2 is a view in elevation of the reel illustrated in FIG. 1 mounted on a section of a pole to which a butt and forward section are atachable;

FIG. 3 is a broken sectional view of the structure illustrated in FIG. 1, taken along the line 3—3 thereof;

FIG. 4 is a broken sectional view of the structure illustrated in FIG. 1, taken along the line 4—4 thereof;

FIG. 5 is an enlarged, broken sectional view of the structure illustrated in FIG. 2, taken along the line 5—5 thereof;

FIG. 6 is a broken sectional view of the structure illustrated in FIG. 1, taken along the line 6—6 thereof;

FIG. 7 is an enlarged, broken sectional view of the structure illustrated in FIG. 3, taken along the line 7—7 thereof;

FIG. 8 is a sectional view of the structure illustrated in FIG. 1, taken along the line 8—8 thereof;

FIG. 9 is a broken sectional view of the structure illustrated in FIG. 1, taken along the line 9—9 thereof;

FIG. 10 is a reduced sectional view of the structural view illustrated in FIG. 1, taken along the line 10—10 thereof;

FIG. 11 is a sectional view of the structure illustrated in FIG. 10, taken along the line 11—11 thereof, and FIG. 12 is a broken sectional view of the structure illustrated in FIG. 10, taken along the line 12—12 thereof.

Referring more particularly to FIGURE 1, the reel of the present invention is illustrated as being provided with a pair of end caps 14 and 15 having an annular flanged ring 16 on the peripheral inner faces thereof against which the ends of spacing rods 17 abut. The ends of the rods have threaded apertures 18 therein into which screws 19 are threaded for retaining the caps 14 and 15 in predetermined spaced relation to each other. The topmost rod 17 has a plate 21 at each end which extends through slots 22 in the annular flanged rings 16, secured in position by the screws 19. The plates have an aperture 24 therein by which a harness may be secured to the reel.

Each of the end caps 14 and 15 has centrally aligned apertures 26 and 27, respectively. A hollow shaft 28 is journaled in a bearing 29 supported in an annular element 31 secured within a recess 32 in the inner central face of the end cap 14. A split ring 33 extends within a groove in the hollow shaft 28 and abuts against the inner race of a bearing 29 to prevent axial movement thereof. The shaft 28 has oppositely disposed flat surfaces 34 thereon, as illustrated in FIG. 8, mating with flat surfaces of an aperture 35 of a ratchet sleeve 36 which is slidable upon the shaft 28 and urged to the left, as viewed in FIG. 1, by a spring 37. The left-hand end portion 38 of the shaft 28 is substantially reduced in diameter for receiving a sleeve 39 which rotates thereon. The right-hand end of the sleeve 39 has a ratchet head 41 thereon containing teeth 42 which engage the teeth 43 in the end of the ratchet element 36. The sleeve 39 is locked upon the reduced shaft portion 38 by a split ring 40. The sleeve 39 is supported on a bearing 44 mounted within the end cap 15. Oppositely disposed dish-shaped spring washers 45 are placed on the end of the sleeve 39. The outermost spring washer 45 is engaged by a cylindrical wall 46 of an end washer 47 which is threaded on a rod 48 and secured in adjusted position by a cotter pin 49. When the rod 48 is pulled to the right, as viewed in FIGURE 1, pressure is applied from the washer 47 through the cylindrical wall 46 to the dish-shaped spring washers 45 to apply a pressure to a brake disk 51 for urging it against a friction pad 52 on the end face 53 of a spool 54 for producing a friction drive relationship between the disk 51 and the spool. The spool 54 is mounted on a pair of shouldered ball bearings 55 which maintain the spool in predetermined position on the hollow shaft 28. The inner race of the right-hand bearing 55 engages a shoulder 56 on the right-hand end of the shaft 28 against which it is urged by a spacer 60 which abuts the split ring 33. A spring 61 is disposed between the inner race of the left-hand bearing 55 and brake disk 51 for urging the disk 51 to the left against the inner race of the bearing 44. This maintains the brake disk normally out of engagement with the friction pad 52 to permit the spool to freely rotate within the end caps 14 and 15.

The aperture 62 at the center of the brake disk 51 has two flats 50 thereon which engage two flat surfaces on the sleeve 39 so as to be in driving relation therewith. When the rod 48 is moved to the right, a load is applied on the bearing 44 through the spring washers 45, which moves the bearing as well as the disk 51 to the right to engage the friction pad 52 and produce a braking and a driving relation between the sleeve 39 and the spool 54. The greater the pull applied to the rod 48, the greater frictional engagement between the spool 54, pad 52 and disk 51, and a greater braking and driving relation occurs therebetween. A cover plate 63 is secured to the center of the end cap 15 to cover the aperture 27, as clearly illustrated in FIGS. 1 and 4.

A pinion 64 is affixed to the right-hand end of the hollow shaft 28, with its teeth in mesh with the teeth of a gear 65 which is rotatably supported within the end cap 14. The gear 65 is supported on a shaft 66 to which the handle 67 is secured by a screw 68. When the handle is rotated, a drive occurs between the gear 65, the pinion 64, the hollow shaft 28, the sleeves 36 and 39 for rotating the brake disk 51. This rotates the spool 54 through the frictional engagement between the disk 51 and the friction pad 52. This degree of frictional engagement depends upon the amount of deflection applied to the spring washers 45 by the movement of the rod 48 to the right.

The right-hand end of the rod 48 extends through a bushing 71 rotatably journaled within the aperture 26 and axially movable therewithin. The bushing 71 has a square or noncircular aperture 72 and a square or noncircular element 73 is slidably disposed therein and threaded on the aperture and slidably keyed to the threaded end 74 of the rod 48. An adjustable thumb nut 75 is threaded upon the threaded end 74 of the rod 48 for the purpose of longitudinally adjusting the rod 48 to the right or left, as the case may be. The body 76 of the thumb nut extends within a counterbored recess 77 of the bushing 71 and has an annular groove 78 in which a resilient annular ring 79 is disposed. The ring 79 is compressed against the wall of the recess 77 to provide frictional engagement therewith for retaining the thumb nut 75 in adjusted position.

Referring more specifically to FIGS. 1, 3 and 7, the bushing 71 is illustrated as having a screw 81 threaded into an aperture 85 thereof. A spring 82 is located within an aperture 83 of a knob 84 which is retained on the screw 81. A reduced inner end portion 86 has a sleeve bearing 87 therein which permits the knob 84 to be retracted on the screw 81. The end of the knob is guided within a cam slot 88, with the inner end resting on oppositely disposed ledges 89 extending inwardly from each side wall at the bottom of the slot, as illustrated in FIG. 7. The cam slot has a faster lead portion at the bottom section 91 thereof and a slower lead portion at the top section 92 thereof. In the bottom section 91 the faster lead permits a faster movement of the rod 48 to the left for releasing the brake disk 51 to permit the free running of the spool. The top section 92, having the slower lead, permits a force to be applied to move the rod 48 to the right and reduces the amount of force required to set the brake a preset amount. Such preset adjusted position is obtained by turning the thumb nut 75 to apply a predetermined tension to the spring washers 45 prior to shifting the knob 84 into the top section 92. The normal preset position is that limited by the stop shoulder 93 in the ledges 89, and if greater tension is required the knob 84 may be pulled outwardly against the tension of the spring 82 sufficient to have the end of the portion 86 rest upon the ledge portions 94 where the knob may be advanced to the stop position indicated by the end wall 95.

As illustrated in FIGS. 1 and 6, the brake disk 51 has teeth 96 on its peripheral edge in engagement with a pawl 97 mounted on a pivot 98 and urged downwardly by a U-shaped spring 99 in the conventional manner. The pawl 97 prevents the movement of the disk 51 counter to the direction in which the spool 54 is driven. The holding of the disk in this manner against counterrotation retains the head 41 of the ratchet mechanism also against counterrotation. When the shaft 28 is driven in counterrotation, the teeth 43 of the ratchet head 36 will ride over a number of the teeth 42 of the head 41 in position to drive the sleeve 39 and disk 51 in the normal direction of rotation when the movement of the handle is reversed.

In FIG. 5, a clicking mechanism is illustrated which produces a whirring sound when the spool is rapidly operated. The mechanism embodies a plunger 101 secured to a knob 102 by a set-screw 103. The knob has a cylindrical body portion 104 disposed within a cylindrical aperture 105 in the end cap 14. An annular flange 106 is provided adjacent to the inner end 107 of the plunger within an aperture 108 containing a spring 109 which urges the end 107 outwardly. The end 107 is arcuately shaped to fit within arcuate recesses 111 in the outer face of the spool which is adjacent to the end cap 14 to produce the clicking or whirring sound when the spool is rapidly rotated. The screw 103 has a head 112 thereon which rides up a cam surface 113 when the knob 102 is rotated counterclockwise until it passes from the cam surface into a notch 114 where it is secured with the end 107 retracted against the tension of the spring 109. When it is desired to have the whirring noise produced, the knob is rotated clockwise from the notch 114 down the cam surface 113 where the end 107 is free to engage the face of the spool in aligned relation to the plurality of arcuate recesses 111 provided therein. For a more detailed description of the general characteristics of the reel, reference may be had to the above mentioned copending application.

Referring to FIGS. 10, 11 and 12, a section 117 of a fish pole is illustrated as being mounted between the end caps 14 and 15 on the center line thereof. A pair of rods 17 extends through apertures 118 of the pole section 117 which is secured centrally thereon by screws 119. Above the rods 17, the pole section is cut away on an arc 120 struck from the center of the spool 54. Each end of the pole section has a socket 121 extending inwardly on the center line thereof and has a threaded end 122 on the outer reduced shouldered portion thereof. Diametrically disposed slots 123 are provided through the threaded ends and a low friction washer 124 of nylon or the like is provided at the base of the threaded ends 122 against the shoulders. The butt end 125, as well as the forward end of the pole, have studs 126 at the joining ends which extend within the sockets 121. The stud 126 has an annular ring 127 thereon and tapered fingers 128 diametrically disposed which extend within the slots 123 of the threaded ends 122. Internally threaded collars 129 are retained upon the studs 126 by the rings 127 engaging an inturned edge flange 131 on the collars. This permits the collars to be threaded upon the threaded end 122 of the pole section 117 against the washers 124 for securely clamping the butt and forward ends of the pole to the pole section. Since the pole is in three sections, it is only necessary to rotate the collars 129 on the butt and forward pole ends and pull the studs 126 thereof from the sockets 121 to completely separate the three sections for storage, with the section 117 remaining a permanent part of the reel.

What is claimed is:

1. In a fishing reel, a spool, a housing encompassing said spool, shaft means journaled in said housing and supporting said spool for rotation, means rotatably driving said shaft means from one end thereof, a sleeve rotatably mounted on the opposite end of the shaft means having a ratchet head containing teeth facing the driving end of the shaft means, a ratchet head on said shaft in driving relation therewith and slidable longitudinally thereof having teeth matable with the teeth on the ratchet head of said sleeve, a spring about said shaft means for urging the ratchet head thereon toward the ratchet head of said sleeve, means connecting the opposite end of said sleeve to said spool in driving relation therewith, said connection means embodying a disk in driving relation with said sleeve, friction means between said disk and the adjacent face of the spool for producing a friction drive therebetween, said disk having teeth on the peripheral edge, a spring-pressed pawl for engaging one of said teeth to prevent the counterrotation of said disk, said shaft means being hollow, a rod extending through said shaft means from one side to the other of the housing, and spring means between said rod and said disk for applying a predetermined pressure thereto to produce frictional engagement with the spool.

2. In a fishing reel, a spool, a housing encompassing said spool, shaft means journaled in said housing and supporting said spool for rotation, means rotatably driving said shaft means from one end thereof, a sleeve rotatably mounted on the opposite end of the shaft means having a ratchet head containing teeth facing the driving end of the shaft means, a ratchet head on said shaft in driving relation therewith and slidable longitudinally thereof having teeth matable with the teeth on the ratchet head of said sleeve, a spring about said shaft means for urging the ratchet head thereon toward the ratchet head of said sleeve, means connecting the opposite ends of said sleeve to said spool in driving relation therewith, said connection means embodying a disk in driving relation with said sleeve, friction means between said disk and the adjacent face of the spool for producing a friction drive therebetween, said disk having teeth on the peripheral edge, a spring-pressed pawl for engaging one of said teeth to prevent the counterrotation of said disk, said shaft means being hollow, a rod extending through said shaft means from one side to the other of the housing, spring means between said rod and disk for applying a predetermined pressure thereto to produce frictional engagement with the spool, and means on said rod on the side of the housing from the end containing said spring means for presetting a load to be applied to said disk.

3. In a fishing reel, a spool, a housing encompassing said spool, shaft means journaled in said housing and supporting said spool for rotation, means rotatably driving said shaft means from one end thereof, a sleeve rotatably mounted on the opposite end of the shaft means having a ratchet head containing teeth facing the driving end of the shaft means, a ratchet head on said shaft in driving relation therewith and slidable longitudinally thereof having teeth matable with the teeth on the ratchet head of said sleeve, a spring about said shaft means for urging the ratchet head thereon toward the ratchet head of said sleeve, means connecting the opposite end of said sleeve to said spool in driving relation therewith, said connection means embodying a disk in driving relation with said sleeve, friction means between said disk and the adjacent face of the spool for producing a friction drive therebetween, said disk having teeth on the peripheral edge, a spring-pressed pawl for engaging one of said teeth to prevent the counterrotation of said disk, said shaft means being hollow, a rod extending through said shaft means from one side to the other of the housing, spring means between said rod and said disk for applying a predetermined pressure thereto to produce frictional engagement with the spool, means on said rod on the side of the housing from the end containing said spring means for presetting a load to be applied to said disk, and cam means for releasing the tension on said spring means independent of the adjustment thereof.

4. In a fishing reel, a spool, a housing encompassing said spool, shaft means journaled in said housing and supporting said spool for rotation, means rotatably driving said shaft means from one end thereof, a sleeve rotatably mounted on the opposite end of the shaft means having a ratchet head containing teeth facing the driving end of the shaft means, a ratchet head on said shaft in driving relation therewith and slidable longitudinally thereof having teeth matable with the teeth on the ratchet head of said sleeve, a spring about said shaft means for urging the ratchet head thereon toward the ratchet head of said sleeve, means connecting the opposite end of said sleeve to said spool in driving relation therewith, said connection means embodying a disk in driving relation with said sleeve, friction means between said disk and the adjacent face of the spool for producing a friction drive therebetween, said disk having teeth on the peripheral edge, a spring-pressed pawl for engaging one of said teeth to prevent the counterrotation of said disk, said shaft means being hollow, a rod extending through said shaft means from one side to the other of the housing, spring means between said rod and said disk for applying a predetermined pressure thereto to produce frictional engagement with the spool, means on said rod on the side of the housing from the end containing said spring means for presetting a load to be applied to said disk, and cam means for releasing the tension on said spring means independent of the adjustment thereof, said releasing means having two stop positions a first position for applying only a portion of the preset load and a second position movable past the first position to apply the full preset load.

5. In a fishing reel, a spool, a housing encompassing said spool, shaft means journaled in said housing and supporting said spool for rotation, means rotatably driving said shaft means from one end thereof, a sleeve rotatably mounted on the opposite end of the shaft means having a ratchet head containing teeth facing the driving end of the shaft means, a ratchet head on said shaft in driving relation therewith and slidable longitudinally thereof having teeth matable with the teeth on the ratchet head of said sleeve, a spring about said shaft means for urging the ratchet head thereon toward the ratchet head of said sleeve, means connecting the opposite end of said sleeve to said spool in driving relation therewith, said connection means embodying a disk in driving relation with said sleeve, friction means between said disk and the adjacent face of the spool for producing a friction drive therebetween, said disk having teeth on the peripheral edge, a spring-pressed pawl for engaging one of said teeth to prevent the counterrotation of said disk, said shaft means being hollow, a rod extending through said shaft means from one side to the other of the housing, spring means between said rod and said disk for applying a predetermined pressure thereto to produce frictional engagement with the spool, means on said rod on the side of the housing from the end containing said spring means for presetting a load to be applied to said disk, and cam means for releasing the tension on said spring means independent of the adjustment thereof, said releasing means having two stop positions, a first position for applying only a portion of the preset load and a second position movable past the first position to apply the full preset load, said cam means including a cam slot having a fast and slow lead at opposite ends thereof.

References Cited by the Examiner
UNITED STATES PATENTS

| | | | |
|---|---|---|---|
| 728,717 | 5/03 | Hunter | 242—84.46 |
| 1,025,976 | 5/12 | Gulliford | 24—56 |
| 1,041,376 | 10/12 | Toepfer | 242—84.5 |
| 1,980,345 | 11/34 | Long et al. | 242—84.44 |
| 2,130,671 | 9/38 | Maynes | 242—84.46 X |
| 2,194,029 | 3/40 | Morehouse | 43—22 |
| 2,271,883 | 2/42 | Bannister | 242—84.44 |
| 2,380,213 | 7/45 | Boor | 242—84.45 |
| 2,417,732 | 3/47 | Bland et al. | 242—84.51 X |
| 2,462,365 | 2/49 | Crawford | 242—84.51 |
| 2,531,610 | 11/50 | Butzman | 242—84.46 X |
| 2,541,183 | 2/51 | Abele | 242—84.53 |
| 2,557,230 | 6/51 | McLeod | 242—84.54 X |
| 2,574,204 | 11/51 | Woody et al. | 192—93 |
| 2,701,131 | 2/55 | Love | 74—56 |

MERVIN STEIN, *Primary Examiner.*

JOSEPH P. STRIZAK, RUSSELL C. MADER,
*Examiners.*